June 11, 1940.　　　　E. E. CONDON　　　　2,203,942
BUMPER GUARD
Filed Jan. 22, 1938
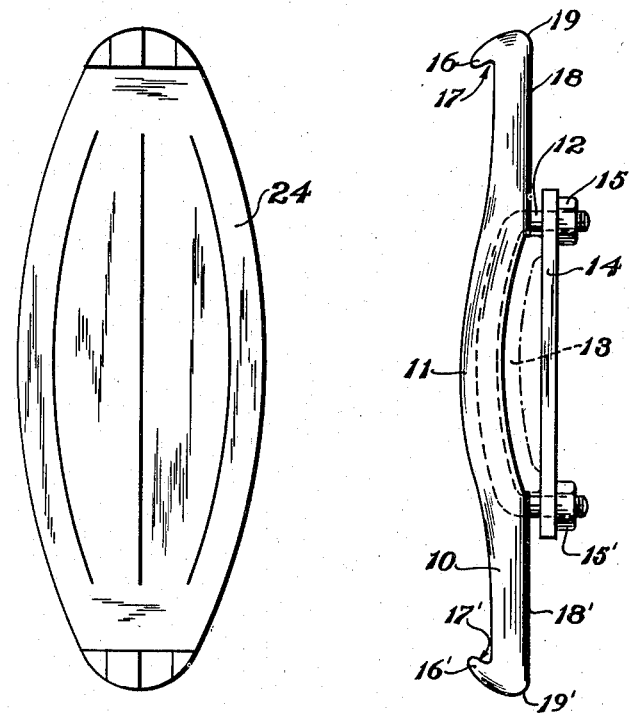
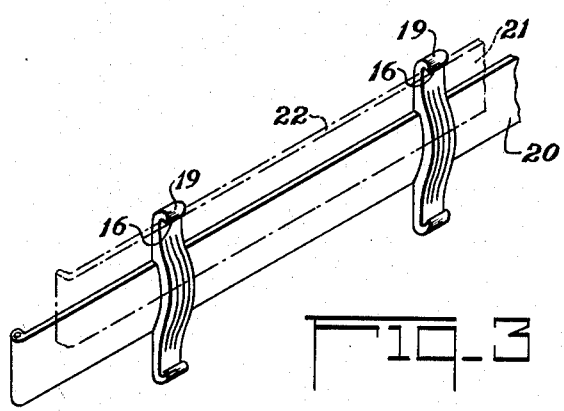
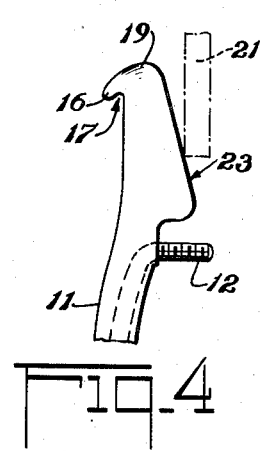
INVENTOR
*ERNEST E. CONDON.*
BY
*Van Deventer & Grier*
ATTORNEYS Patented June 11, 1940

2,203,942

UNITED STATES PATENT OFFICE 2,203,942

BUMPER GUARD

Ernest E. Condon, Flushing, N. Y.

Application January 22, 1938, Serial No. 186,356

1 Claim. (Cl. 293—55)

This invention relates to a bumper guard for bumpers as commonly used on automobiles and the like, and has for its object the provision of a guard which is readily attached to bumpers now in use without requiring any change in the bumper.

Another object is to provide a bumper guard which will prevent hooking of one bumper over another, and a further object is to provide a guard which is simple in construction and cheap to manufacture.

In the accompanying drawing which shows a preferred form of the device, by way of illustration:

Figure 1 is a side view of the bumper guard constituting this invention;

Figure 2 is a front view of the guard, Figure 1;

Figure 3 is a perspective view of a bumper with guards in place, showing how the guards prevent hooking; and Figure 4 is a view of the bumper, Figure 1, with an alternate form of upper and lower end.

The guard 10 may be made of any suitable material, preferably metal, and may be cast, drop forged or stamped. The center portion 11 is struck outwardly as shown in Figure 1 and the clamp 12 is secured to the rear of the guard so that the threaded ends thereof project rearwardly. This clamp embraces the usual fender 13, the guard being secured thereto by means of the plate 14 which is drilled to fit the threaded ends of the guard 12 and which is secured thereto by means of the clamp nuts 15, 15'.

The ends of the guard 10 are provided with outwardly extending lips or hooks 16, 16', which form together with the front surface of the guard, a stepped or depressed portion at each end as shown at 17, 17', the engaging surfaces of which make an angle greater than 70° with the front surface of the guard.

The rear surface of the guard as indicated at 18, 18' may be flat, the ends of the guard being rounded as indicated at 19, or this rear surface may be slightly sloped outwardly from the clamp for a purpose hereinafter described.

It often occurs when an automobile is standing at the curb and equipped with the usual front and rear bumper 20 that another car in backing in or in attempting to get out of the line at the curb, will hook the bumper 20 by reason of the fact that the bumper on the second car such as that indicated in dotted lines 21, Figure 3, will ride up and over the bumper 20 of the parked car. A similar condition of hooking often occurs when one car bumps another from the rear, and it is difficult and in some cases impossible to unhook the bumpers without dismounting the same.

By using the improved guard constituting this invention, this hooking of the bumpers is prevented, the guard being of sufficient vertical height so that the hook 16 on the upper end 19 will engage and hold the upper edge 22 of a bumper 21 preventing the same from sliding over and hooking on the bumper 20. It will be seen that the forwardly extended lips 16 and 16' have their inner surfaces sloped but slightly from the horizontal to form self-releasing stops. By this construction a bumper 21 engaging these members cannot become locked within the stops themselves.

The operation of the device will be obvious from a study of the drawing, Figure 3.

In the event that by reason of some inequality in the road or because of some other unusual condition, the bumper 21 should slip over the end of the guard so as to lodge behind same in contact with the surface 18 thereof, by reason of the rounded portion 19 of the guard and the fact that the rear portion 18 thereof may be made at an angle to the body as indicated at 23, the bumper 21 may be as easily unhooked from this type of improved guard as from the ordinary flat guards in common use, as the slanting portion 23 permits the bumper 21 to be moved forwardly and upwardly over the rounded end 19 and released therefrom.

It will be noted that the center portion of the guard 11 extends outwardly so that it will first contact any surface with which the guard comes in contact thereby preventing the lips 16, 16' from marring said surface. The front surface 24 of the guard may be ornamented in any suitable manner and if the guard is made from stamped metal it may be ribbed as shown in order to increase its strength to resist bending.

What is claimed is:

A bumper guard for vehicle bumpers, including a substantially vertical body having adjacent to its extremities, short outwardly extending lips forming hooks adapted to engage other bumpers with which it may come in contact, the engaging surfaces of said lips being continuous with said lips and forming adjacent thereto an angle greater than 70° with the surface of said body, and the depth of said lips from the outer ends thereof to the surface of said body being of a dimension approaching the average thickness of said other bumpers, whereby the latter engaging said guard within the limits bounded by said lips are prevented from riding over the ends of said guard, and readily become separated when the guard and the bumper with which it is engaged are urged apart in opposite directions.

ERNEST E. CONDON.